(12) United States Patent
Abiru

(10) Patent No.: US 8,372,318 B2
(45) Date of Patent: Feb. 12, 2013

(54) METHOD FOR PRODUCING A BRIGHTNESS ENHANCEMENT SHEET

(75) Inventor: Daisaku Abiru, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 671 days.

(21) Appl. No.: 12/569,180

(22) Filed: Sep. 29, 2009

(65) Prior Publication Data

US 2010/0080008 A1 Apr. 1, 2010

(30) Foreign Application Priority Data

Sep. 30, 2008 (JP) ................................. 2008-252683

(51) Int. Cl.
*B29D 11/00* (2006.01)
(52) U.S. Cl. ........... 264/1.6; 264/1.7; 264/216; 264/217
(58) Field of Classification Search .................. 264/1.1, 264/1.6, 1.7, 212, 216, 217
See application file for complete search history.

(56) References Cited

U.S. PATENT DOCUMENTS

| 2004/0066556 A1* | 4/2004 | Dontula et al. ............... 359/599 |
| 2005/0275334 A1* | 12/2005 | Park et al. ..................... 313/495 |
| 2006/0056031 A1* | 3/2006 | Capaldo et al. ............... 359/619 |
| 2007/0124122 A1* | 5/2007 | Freier ............................... 703/2 |

FOREIGN PATENT DOCUMENTS

JP 10-082903 3/1998

* cited by examiner

*Primary Examiner* — Mathieu D. Vargot
(74) *Attorney, Agent, or Firm* — Young & Thompson

(57) ABSTRACT

A plurality of substantially conical or pyramidal elements are formed inside a sheet-like binder. The binder has smooth surfaces. The elements and the binder cooperate to refract light incident on a brightness enhancement sheet from a surface on a diffusion sheet side to the other surface in a direction normal to the brightness enhancement sheet. Thus, the front brightness is enhanced. The elements are distributed along one of the surfaces of the brightness enhancement sheet with vertices pointing in one direction toward one of the surfaces. The elements are formed by trapping gas bubbles in the binder and differ in refractive index from the binder.

4 Claims, 5 Drawing Sheets

METHOD FOR PRODUCING A BRIGHTNESS ENHANCEMENT SHEET

FIELD OF THE INVENTION

The present invention relates to a brightness enhancement sheet for enhancing brightness in a direction normal to a surface of this brightness enhancement sheet and a method for producing the same.

BACKGROUND OF THE INVENTION

Liquid crystal displays (LCDs) have become widespread. Such LCDs have low power consumption and thin-profile, and are used in various devices ranging from small devices such as a monitor of a notebook computer, a digital camera and a mobile phone to large devices such as a home TV. Backlight LCDs whose LCD panel is illuminated with a backlight are commonly used.

Generally, the backlight LCD is composed of an LCD panel and a light source unit (backlight). The LCD panel changes light transmittance in response to an electric signal. The light source unit irradiates illumination light from the back of the LCD panel. The LCD panel includes a pair of polarizing filters and a liquid crystal cell. The polarizing filters are arranged in cross nicols. The liquid crystal cell is sandwiched between the pair of polarizing filters, and changes the polarizing state of the light passing therethrough. The light source unit includes a light source such as a fluorescent tube, a diffusion sheet and a brightness enhancement sheet. The diffusion sheet scatters and diffuses light from the light source to uniformly illuminate the entire surface of the LCD panel. The brightness enhancement sheet is a so-called BEF (Brightness Enhancement Film) that enhances front brightness.

A prism sheet is used as the brightness enhancement sheet as described in Japanese Patent Laid-Open Publication No. 10-082903, for example. One of the surfaces of the prism sheet is formed with a plurality of prisms, each having a triangular cross-section, with a predetermined pitch. The light incident from the surface opposite to the prism-formed surface is refracted and directed in the direction normal thereto through the prisms. As a result, the light distribution shows a large peak in the direction normal to the prism sheet. The illumination light enters the LCD panel through the prism sheet, and thus the front brightness of the LCD is enhanced. On the prism sheet, the prisms extend in one direction and arranged parallel to each other. The illumination light is output along a direction in which the prisms are arranged. For this reason, two prism sheets overlaid at an angle of 90 degrees to each other may be used.

Since prism apexes formed on the surface of the prism sheet are pointed, the prism sheet may frequently damage the surface of adjacent components, for example, the diffusion sheet and the LCD panel. In addition, projections and depressions formed by the prisms on the surface of the prism sheet increase the thickness thereof. For these reasons, the prism sheet requires a large spacing in the LCD and increases the number of components, resulting in cost increase. Thus, the prism sheet has been one of the factors that hinder the reduction of the profile of the LCDs.

To produce the prism sheet, UV curable polymer is applied to a roll or a mold on which a prism pattern is formed, and the roll or the mold is overlaid on the substrate, and cured by UV rays, for example. This production process has a limited production speed, resulting in low productivity. In addition, the production of the prism sheet requires extremely fine processing on the surface thereof, making the prism sheet expensive due to low yields.

SUMMARY OF THE INVENTION

In view of the foregoing, an object of the present invention is to provide a brightness enhancement sheet and a method for producing the same with high productivity.

Another object of the present invention is to provide a space saving brightness enhancement sheet that reduces thickness of an LCD and a method for producing the same.

In order to achieve the above and other objects, a brightness enhancement sheet of the present invention includes a sheet body containing transparent polymer, and a plurality of substantially conical or pyramidal elements distributed inside and along one of surfaces of the sheet member. Vertices of the elements point in one direction toward one of the surfaces of the sheet member. Each of the elements differs in refractive index from the polymer.

It is preferable that each of the elements has a lower refractive index than the polymer It is preferable that the surfaces of the sheet body are smooth.

It is preferable that a difference in a refractive index between each of the elements and the polymer is at least 0.02.

In a case that each of the elements has a lower refractive index than the polymer, it is preferable that a ratio of a total projected area of the plurality of elements to an area of the surface is at least 0.5 when the elements are projected onto the surface in a direction normal to the surface.

It is preferable that the brightness enhancement sheet further includes a transparent base layer applied to the sheet body.

It is preferable that the elements are gas bubbles. A method for producing a brightness enhancement sheet includes a forming step and a floating step. In the forming step, a casting film is formed by casting a dope on a moving support. The dope contains a solution and a plurality of gas bubbles or liquid bubbles dispersed in the solution. The solution contains polymer and has predetermined viscosity. The gas bubbles or the liquid bubbles have lower specific gravity and differ in refractive index from the polymer. In the floating step, while the inside of the casting film has fluidity, the gas bubbles or the liquid bubbles float up inside the casting film by a difference in specific gravity between the solution and the gas bubbles or the liquid bubbles and are formed into a plurality of substantially conical or pyramidal elements with vertices pointing down and arranged inside the casting film.

It is preferable that the gas bubbles or liquid bubbles have a lower refractive index than the polymer.

A method for producing a brightness enhancement sheet includes a forming step and a floating step. In the forming step, a casting film is formed by casting a dope on a moving support. The dope contains a solution and a plurality of elements dispersed in the solution. The solution contains polymer and has predetermined viscosity. The elements are made of a solid material and substantially conical or pyramidal in shape. The elements have lower specific gravity and differ in refractive index from the polymer. In the floating step, while the inside of the casting film has fluidity, the elements float up inside the casting film by a difference in specific gravity between the solution and the elements and are arranged in the casting film such that vertices of the elements point in one direction toward one of surfaces of the casting film.

It is preferable that the solid has a lower refractive index than the polymer.

According to the brightness enhancement sheet of the present invention, the plurality of the elements are provided inside the sheet member. As a result, the surfaces of the bright enhancement sheet are made smooth, and thus the brightness enhancement sheet can be overlaid or disposed close to the adjacent components. Thus, the space for the brightness enhancement sheet is saved.

According to a method for producing the brightness enhancement sheet of the present invention, the elements differ in refractive index from the polymer are formed and arranged in the brightness enhancement sheet during the film production process by casting. As a result, the brightness enhancement sheets are produced at high speed. In addition, steps for forming prisms on the surface of the brightness enhancement sheet and the like other than steps for producing the brightness enhancement sheet itself become unnecessary. Thus, steps and an apparatus for producing the brightness enhancement sheet are simplified.

BRIEF DESCRIPTION OF THE DRAWINGS

The above objects and advantages of the present invention will become more apparent from the following detailed description when read in connection with the accompanying drawings, in which.

DESCRIPTION OF THE PREFERRED EMBODIMENTS

Figure 1:
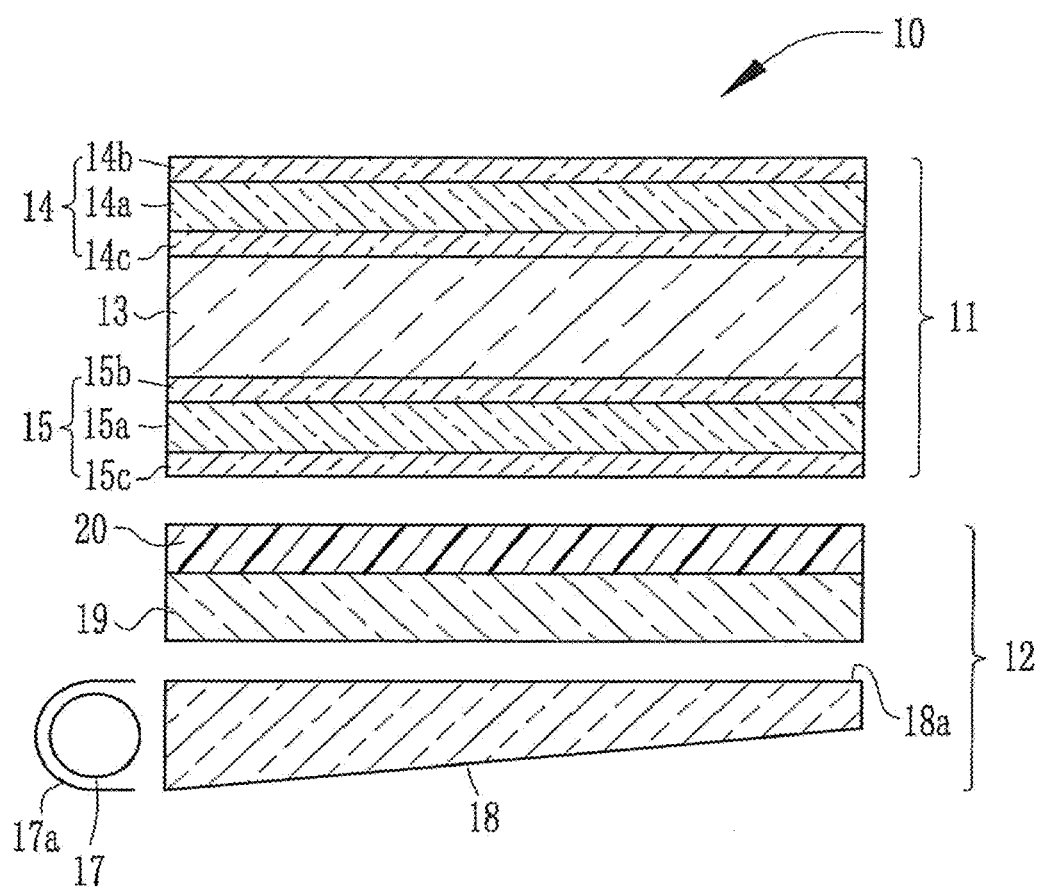
FIG. 1 is an external perspective view of a liquid crystal display (LCD) of the present invention.

In FIG. 1, a liquid crystal display (LCD) 10 is composed of an LCD panel 11 and a light source unit 12. The LCD panel 11 is composed of a liquid crystal cell 13 and two polarizing filters 14 and 15. The liquid crystal cell 13 has transparent glass substrates (not shown) between which a liquid crystal material is filled. A transparent electrode (not shown) is formed on the inner side of each of the glass substrates. A voltage is applied between the transparent electrodes to change the polarization state of light passing through the glass substrates.

The polarizing filter 14 is composed of a polarizing film 14a, and a pair of protection films 14b and 14c adhered to the surfaces of the polarizing film 14a. The polarizing filter 15 has the same structure as the polarizing filter 14, and is composed of a polarizing film 15a, and a pair of protection films 15b and 15c. The polarizing filters 14 and 15 are arranged in cross nicols, and the liquid crystal cell 13 is sandwiched therebetween.

The light source unit 12 illuminates the LCD panel 11 from behind. The light source unit 12 is an edge-light type and composed of a light source lamp 17, a light guide plate 18, a diffusion sheet 19, and a brightness enhancement sheet 20. The light source lamp 17 is, for example, a straight fluorescent tube that fits along an edge of the wedge-shaped light guide plate 18. The illumination light from the light source lamp 17 enters the edge portion of the light guide plate 18 directly or upon reflection by a reflector 17a. Thereafter, the illumination light is reflected inside the light guide plate 18, and output from a light output surface 18a that is substantially the same size as the LCD panel 11.

The diffusion sheet 19 is used for uniformly illuminating the entire surface of the LCD panel 11, and is disposed close to the light output surface 18a. The illumination light output from the light output surface 18a is scattered and diffused while passing through the diffusion sheet 19. Examples of the diffusion sheet 19 include a transparent sheet on which bead-like light diffusion materials are dispersed, and a sheet in which the light diffusion materials are dispersed. To make the light source unit 12 thin, it is preferable to overlay the diffusion sheet 19 on the brightness enhancement sheet 20, and in addition, it is preferable to make surfaces of the diffusion sheet 19 smooth by dispersing the light diffusion material inside the diffusion sheet 19, for example. In this embodiment, therefore, the light diffusion material is distributed inside the diffusion sheet 19.

The brightness enhancement sheet 20 is disposed between the LCD panel 11 and the diffusion sheet 19 so as to enhance front brightness. The brightness enhancement sheet 20 controls distribution of the illumination light to increase the amount of illumination light output to the direction normal to the LCD panel 11. The size of the brightness enhancement sheet 20 is substantially equal to the rear surface of the LCD panel 11. The illumination light diffused through the diffusion sheet 19 enters the brightness enhancement sheet 20, and is output from the brightness enhancement sheet 20. Then, the illumination light enters the LCD panel 11. It is preferable that the brightness enhancement sheet 20 enhances the front brightness by at least 5%.

Figure 2:
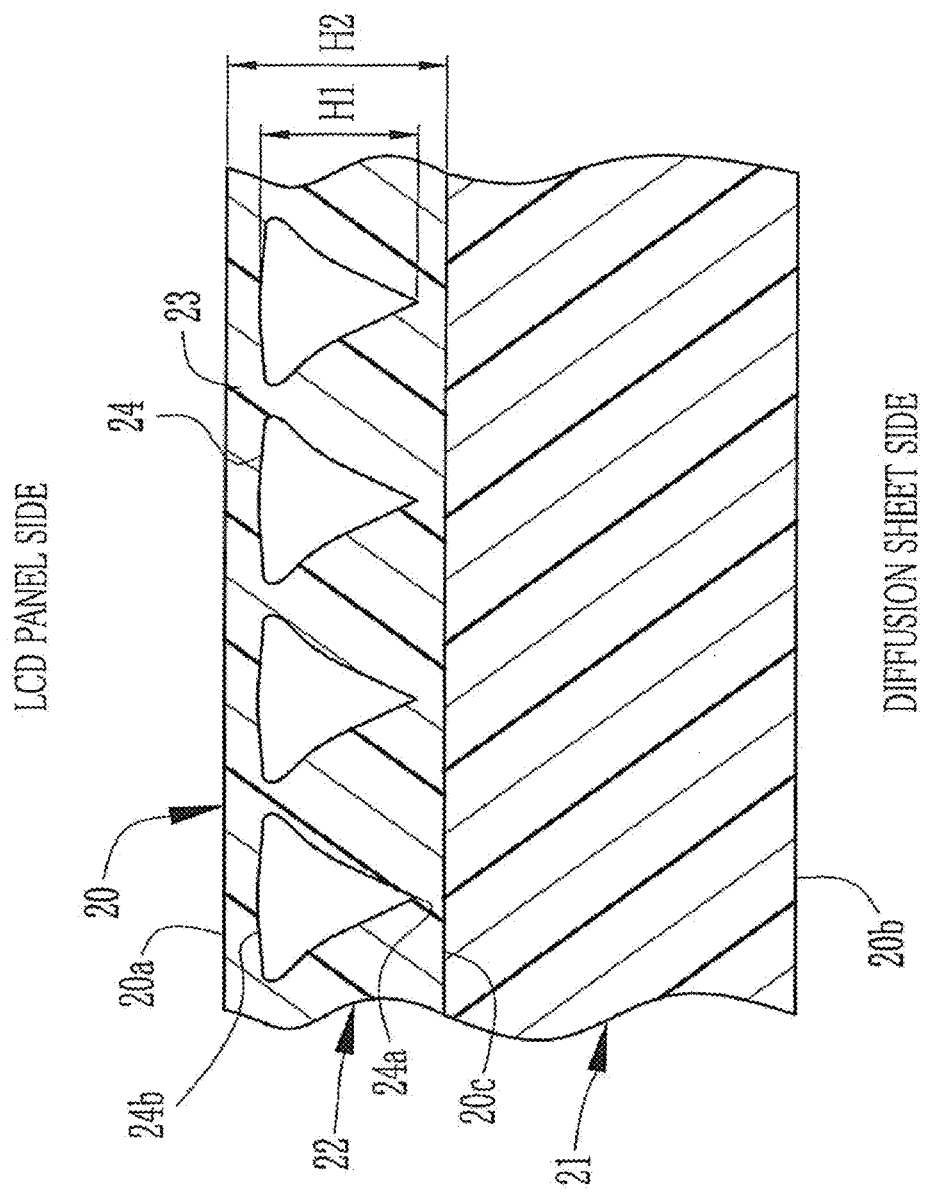
FIG. 2 is a cross-sectional view of a brightness enhancement sheet of the present invention.

As shown in FIG. 2, the brightness enhancement sheet 20 is composed of a base layer 21 and a brightness enhancement layer 22 overlaid on one of the surfaces of the base layer 21. The brightness enhancement sheet 20 is a sheet whose surfaces 20a and 20b are smooth. The surface 20a is on the LCD panel 11 side. The surface 20b is on the diffusion sheet 19 side.

The base layer 21 is provided for improving handling property and strength of the brightness enhancement sheet 20, and for adjusting the thickness thereof, but not necessarily required. The base layer 21 is made from polymer with high light transmittance and has a uniform thickness. The polymer used for the base layer 21 may be the same as or different from the polymer used for the brightness enhancement layer 22 as long as it can be formed into a thin film and has high light transmittance.

In a case that the base layer 21 and the brightness enhancement layer 22 are made from the same polymer, the base layer 21 and the brightness enhancement layer 22 may be merged into one layer during the production process so that a boundary 20c between the base layer 21 and the brightness enhancement layer 22 may disappear (not shown). Such disappearance of the boundary 20c presents no problem. In a case that the boundary 20c exists, the boundary 20c is made into a smooth interface. In a case that the brightness enhancement sheet 20 is composed only of the brightness enhancement layer 22 without the base layer 21, the surfaces of the brightness enhancement layer 22 are made smooth.

The brightness enhancement layer 22 is composed of a binder 23 and a plurality of substantially conical or pyramidal elements 24 formed inside the binder 23. Hereinafter, the substantially conical or pyramidal elements 24 may be simply referred to as elements 24. The binder 23 is made from TAC (cellulose triacetate). Alternatively, any other known polymer can be used as long as it has high light transmittance and can be formed into a thin film. It is preferable that the polymer is optically isotropic. An example of such polymer is cellulose acylate.

Of the cellulose acylate, TAC is especially preferable. TAC satisfies all of the following formulae (1)-(3) in a substitution degree of the acyl group, that is, a percentage of esterification of the hydroxyl group of cellulose using carboxylic acid.

$$2.5 \leq A+B \leq 3.0 \tag{1}$$

$$0 \leq A \leq 3.0 \tag{2}$$

$$0 \leq B \leq 2.9 \tag{3}$$

In these formulae, A is the degree of substitution of the acetyl group for the hydrogen atom of the hydroxyl group, and B is a degree of substitution of the acyl group with 3-22 carbon atoms for the hydroxyl group.

The cellulose is composed of glucose units making β-1, 4 combination, and each glucose unit has a free hydroxyl group at second, third and sixth positions. Cellulose acylate is a polymer in which a part or the whole of the hydroxyl groups are esterified so that the hydrogen is substituted by acyl group with two or more carbons. The degree of substitution of the acyl groups in cellulose acylate is a degree of esterification of the hydroxyl group at the second, third or sixth position in cellulose. Accordingly, when all (100%) of the hydroxyl groups at the same position are substituted, the degree of substitution is 1. When all of the hydroxyl groups at the second, third and sixth positions are substituted, the degree of substitution is 3.

When the degrees of substitution of the acyl groups for the hydroxyl group at the second, third or sixth positions are respectively described as DS2, DS3 and DS6, the total degree of substitution of the acyl groups for the hydroxyl group at the second, third and sixth positions (namely DS2+DS3+DS6) is preferably in the range from 2.00 to 3.00, particularly preferably in the range from 2.22 to 2.90, and especially preferably in the range from 2.40 to 2.88. Further, it is preferable that DS6/(DS2+DS3+DS6) is at least 0.32. It is particularly preferable that DS6/(DS2+DS3+DS6) is at least 0.322. It is especially preferable that DS6/(DS2+DS3+DS6) is in the range from 0.324 to 0.340.

One or more sorts of acyl group may be contained in the cellulose acylate of the present invention. When two or more sorts of the acyl groups are used, it is preferable that one of them is acetyl group. When the total degree of substitution of the acetyl groups for the hydroxyl group at the second, third or sixth positions is described as DSA, and the total degree of substitution of acyl groups other than the acetyl group for the hydroxyl group at the second, third or sixth positions is described as DSB, the value DSA+DSB is preferably in the range of 2.2 to 2.86, and particularly preferably in the range of 2.90 to 2.8. Further, the DSB is preferably at least 1.50, and especially preferably at least 1.7. Further, in DSB, the percentage of the substituents for the hydroxyl group at the sixth position is preferably at least 28%, more preferably at least 30%, furthermore preferably at least 31% and especially preferably at least 32%. Further, the degree of the acyl groups at sixth position is preferably at least 0.75, more preferably at least 0.80, and especially preferably at least 0.85. Using cellulose acylate satisfying the above conditions, a solution (or dope) having a preferable dissolubility is prepared. Especially when non-chlorine type organic solvent is used, the appropriate dope with a low viscosity and a high filterability can be prepared.

The acyl group having at least 2 carbon atoms may be aliphatic group or aryl group, and is not especially restricted. Examples of the cellulose acylate include alkylcarbonyl ester, alkenylcarbonyl ester, aromatic carbonyl ester and aromatic alkylcalbonyl ester. The cellulose acylate may be esters having other substituents. The preferable substituents include propionyl group, butanoyl group, pentanoyl group, hexanoyl group, octanoyl group, decanoyl group, dodecanoyl group, tridecanoyl group, tetradecanoyl group, hexadecanoyl group, octadecanoyl group, iso-butanoyl group, t-butanoyl group, cyclohexane carbonyl group, oleoyl group, benzoyl group, naphtylcarbonyl group and cinnamoyl group. Of these substituents, propionyl group, butanoyl group, dodecanoyl group, octadecanoyl group, t-butanoyl group, oleoyl group, benzoyl group, naphtyl carbonyl group, cinnamoyl group and the like are more preferable, and propionyl group and butanoyl group are especially preferable. Cellulose acylate is detailed in paragraphs from [0140] to [0195] of Japanese Patent Laid-Open Publication No. 2005-104148, and these descriptions may be applied to the present invention.

The binder 23 may contain various additives such as a plasticizer, a deterioration inhibitor, an ultraviolet absorbing agent (UV agent), an optical anisotropy controlling agent, a dye, a matting agent, and a peeling agent. These additives are described in paragraphs [0196] to [0516] of Japanese Patent Laid-Open Publication No. 2005-104148, and these descriptions may be applied to the present invention.

The elements 24 and the binder 23 cooperate to enhance the front brightness by refracting the light, incident from the surface 20b of the brightness enhancement sheet 20 on the diffusion sheet 19 side, in a direction normal to the brightness enhancement sheet 20. The element 24 has a lower refractive index than the binder 23. In this example, the elements 24 are formed by trapping air bubbles in the binder 23. Since the elements 24 are formed inside the binder 23, the brightness enhancement sheet is made thin and smooth. Accordingly, the brightness enhancement sheet 20 can be overlaid or placed close to adjacent components.

The element 24 is substantially conical or pyramidal in shape with its vertex 24a pointing toward the surface 20b on the light input side, that is, on the diffusion sheet 19 side. A base 24b of the element 24 faces the surface 20a on the light output side, that is, on the LCD panel 11 side. A plurality of elements 24 are distributed along the surface 20a. The binder 23 is cellulose triacetate and has the refractive index of approximately 1.48. The refractive index of air is approximately 1.0.

The element 24 may be a solid, a liquid bubble (liquid), or a gas bubble (gas) as long as it has a lower refractive index than the binder 23. It is preferable that a refractive index difference, namely, a difference between the refractive indices of the binder 23 and the element 24 is at least 0.02 in view of enhancing the front brightness. It is preferable that the refractive index difference be large so as to increase potential of the front brightness enhancement.

Examples of the substances for forming the elements 24 satisfying the above-described refractive index difference include water and various gases such as oxygen, nitrogen, and air. Since gases have the refractive indices of approximately 1.0, they are suitably used in various binders 23. It should be noted that the kinds of the gas used for forming gas bubbles are not particularly limited.

Specific gravity of the solid, the liquid bubbles or the gas bubbles used for forming the elements 24 is not particularly limited. However, in a case that the elements 24 are formed and arranged inside the casting film by the buoyant force of the solid, the liquid bubbles or the gas bubbles, the elements 24 are formed of a solid, a liquid or a gas with the specific gravity lower than a solution which will be formed into the binder 23.

It is preferable that the element 24 has a shape that maximizes the refraction of light incident from the diffusion sheet 19 at various angles to the direction normal to the brightness enhancement sheet 20. Since the element 24 enhances the front brightness by refracting light incident on a curved or sloped interface between the binder 23 and the element 24 to the direction normal to the brightness enhancement sheet 20, a conical shape is one of the ideal shapes for the element 24. The vertex angle of the conical element 24 is preferably less than 80 degrees, and more preferably less than 60 degrees.

Instead of the conical shape, the element 24 may preferably take a pyramidal shape such as a triangular pyramid or a rectangular pyramid. However, the shape may not necessarily be precisely conical or pyramidal. The element 24 may be substantially conical or pyramidal in shape, and a portion corresponding to a vertex of a cone or a pyramid may be round, or surfaces corresponding to a base and sides of a cone or a pyramid may be convex, concave, or curved. Furthermore, the surfaces corresponding to the base and the sides may not necessarily be clearly distinguished.

Figure 3:
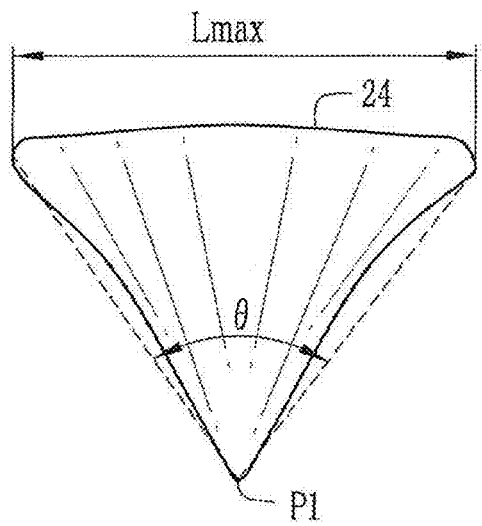
FIG. 3 is an explanatory view of a vertex-corresponding angle of a substantially conical element.

As shown in FIG. 3, in a case that the element 24 is substantially conical or pyramidal in shape, an angle $\theta$ of a portion corresponding to a vertex is preferably less than 80 degrees, and more preferably less than 60 degrees. Hereinafter, the angle $\theta$ is referred to as vertex-corresponding angle. The vertex-corresponding angle $\theta$ is an angle between imaginary lines extending from a point P1 to ends of a maximum width Lmax. The point P1 corresponds to the vertex of the element 24. The maximum width Lmax is a maximum width of the element 24 when viewed in the direction normal to the brightness enhancement sheet 20.

Regardless of whether the element 24 is substantially conical or pyramidal in shape, the element 24 is formed with the vertex or a portion corresponding to the vertex pointing toward the light input side. However, the vertex or the portion corresponding to the vertex may not necessarily point exactly to the light input side.

As shown in FIG. 2, it is preferable that a height H1 of the element 24, that is, a length in the thickness direction of the brightness enhancement layer 22 is at least 10 μm and at most 50 μm. In a case that the height H1 is less than 10 μm, scattering of the incident light becomes dominant in the element 24 so that the brightness enhancement properties cannot be achieved. A thickness H2 of the brightness enhancement layer 22 may be equal to or larger than the height H1.

It is preferable that the elements 24 distributed in the brightness enhancement layer 22 are uniform in size and shape without significant variations, so as to prevent unevenness in brightness enhancement properties of the brightness enhancement sheet 20.

Figure 4:
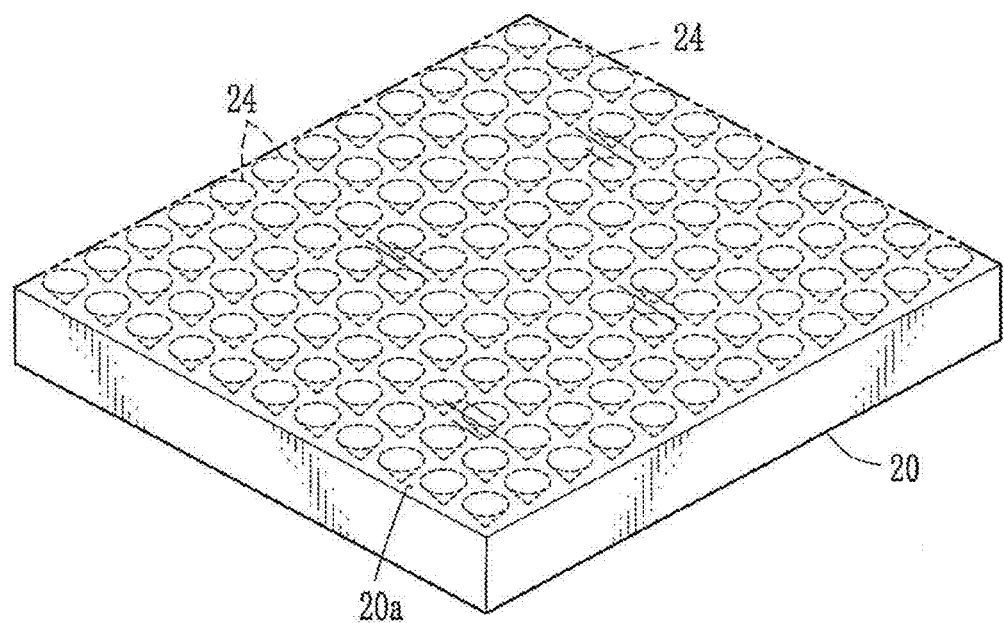
FIG. 4 is a perspective view showing distribution of the elements in the brightness enhancement sheet.

As shown in FIG. 4, in view of preventing brightness unevenness, it is preferable that the plurality of elements 24 are uniformly distributed along the surface 20a of the brightness enhancement sheet 20. In addition, it is more preferable that the elements 24 are regularly and densely distributed. The positions of the elements 24 in the thickness direction of the brightness enhancement sheet 20 may vary to a certain extent, but are preferred to be uniform in the thickness direction. In FIG. 4, the elements 24 are arranged in a matrix. Alternatively, the elements 24 may be arranged in a staggered configuration.

As shown in FIG. 4, it is preferable that the elements 24 are distributed in a single layer such that the elements 24 are not distributed behind one another in the direction normal to the brightness enhancement sheet 20. However, the elements 24 may be distributed behind one another, or stacked, in a case that the elements 24 are arranged regularly and stacked uniformly in the direction normal to the brightness enhancement sheet 20. The brightness enhancement sheet 20 may be formed with a plurality of the brightness enhancement layers 22 each having the elements 24 in a single layer or in a stack.

To densely distribute the elements 24, it is preferable to minimize clearance between the elements 24. For example, in a case that a shape of the element 24 projected onto the surface of the brightness enhancement sheet 20 in the direction normal thereto is a circle with a radius r, it is preferable that a distance between centers of the circles of the projected elements 24 is 2r.

Although the elements 24 are formed of gas bubbles or liquid bubbles, it is preferable that these elements 24 be arranged closely to each other. During the production of the brightness enhancement sheet, the solution (binder 23) forms boundaries between the gas or liquid bubbles. Since the solution has a certain degree of viscosity, it stays between the gas or liquid bubbles and the boundaries thereof are maintained. Thus, the elements 24 made of gas or liquid bubbles are formed closely to each other.

To obtain sufficient brightness enhancement properties, it is preferable to make a projected area ratio of the elements 24 at least 0.5. The projected area ratio is a ratio of a total projected area of the elements 24 to an area of the surface of the brightness enhancement sheet 20 when the elements 24 are projected onto the surface of the brightness enhancement sheet 20 in the direction normal to the brightness enhancement sheet 20.

In the above configuration, the illumination light output from the diffusion sheet 19 enters the brightness enhancement sheet 20. Since the illumination light is substantially uniformly diffused in the diffusion sheet 19, the illumination light enters the brightness enhancement sheet 20 at various incident angles. Part of the light that entered the brightness enhancement sheet 20 passes therethrough in straight lines, and is output from the LCD panel 11 side.

On the other hand, when light is incident on an interface between the binder 23 and the element 24, the light is refracted at a refraction angle corresponding to the incident angle due to a refractive index difference between the binder 23 and the element 24, and travels inside the element 24. When the light is output from the element 24 to the binder 23, the light is refracted again. Thereafter, the light is output from the LCD panel 11 side of the brightness enhancement sheet 20.

By virtue of the refractive index difference between the binder 23 and the elements 24, a larger amount of light is refracted so as to be directed toward the direction normal to the brightness enhancement sheet 20. Thus, the illumination light with the enhanced front brightness enters the LCD panel 11 from the brightness enhancement sheet 20. As a result, the front brightness of the LCD 10 enhances.

Figure 5:
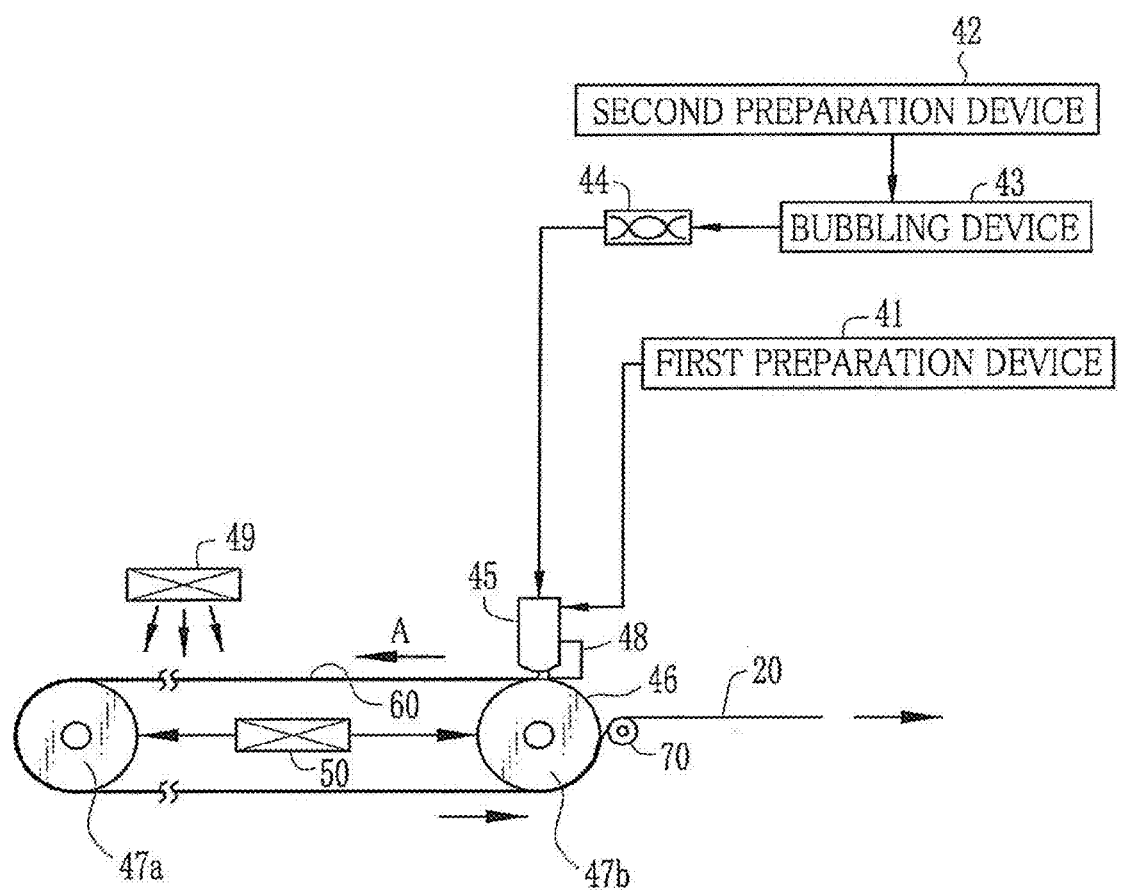
FIG. 5 is an explanatory view of an apparatus for producing the brightness enhancement sheet.

In FIG. 5, a first preparation device 41 prepares a first dope for forming the base layer 21 and sends it to the casting die 45. The first dope contains a solvent in which TAC is dissolved. The first preparation device 41 is provided with a concentration regulator (not shown) that regulates the concentration of TAC in the first dope. With the use of this concentration regulator, the viscosity of the first dope is regulated.

A second preparation device 42 prepares a second dope for forming the brightness enhancement layer 22, and sends it to the bubbling device 43. Similar to the first dope, the second dope contains a solvent in which TAC is dissolved. The second preparation device 42 is provided with a concentration regulator (not shown) that regulates the concentration of TAC in the second dope. With the use of this concentration regulator, the viscosity of the second dope is regulated.

Examples of solvent compounds used for dissolving polymer in producing the dope include aromatic hydrocarbon (for example, benzene and toluene), halogenated hydrocarbons (for example, dichloromethane and chlorobenzene), alcohols (for example methanol, ethanol, n-propanol, n-butanol and diethylene glycol), ketones (for example acetone and methylethyl ketone), esters (for example, methylacetate, ethylacetate and propylacetate), ethers (for example tetrahydrofuran and methylcellosolve). It should be noted that the dope is a polymer solution or polymer dispersion in which polymer is dissolved in a solvent or dispersed in a dispersion medium.

Of those, halogenated hydrocarbons having 1 to 7 carbon atoms are preferable, and dichloromethane is especially preferable. In view of physical properties such as solubility of TAC, peelability of a casting film from a support, mechanical strength and optical properties of the brightness enhancement sheet 20, it is preferable to mix at least one sort of the alcohol having 1 to 5 carbon atoms into dichloromethane. The content of the alcohols is preferably in a range from 2 wt % to 25 wt. %, and more preferably in a range from 5 wt % to 20 wt. % of the solvent. Preferable specific examples of the alcohols include methanol, ethanol, n-propanol, isopropanol and n-butanol. Of those, it is preferable to use methanol, ethanol, n-butanol or a mixture thereof.

In order to minimize the influence on the environment, the solution may be prepared without dichloromethane. In this case, the solvent preferably contains ethers with 4 to 12 carbon atoms, ketones with 3 to 12 carbon atoms, esters with 3 to 12 carbon atoms, or a mixture of them. The ethers, ketones and esters may have cyclic structures. A solvent compound having at least two functional groups thereof (—O—, —CO— and —COO—) may be contained in the solvent. The solvent compound may have other functional group such as alcoholic hydroxy group.

Methods for producing the dope are not particularly limited. However, in a case that the casting film, formed from a solution cast on a casting belt, is hardened by cooling and peeled, it is preferable to make concentration of the solid content, for example, cellulose acylate, in the solution higher than the solution used for forming the casting film by drying. It is preferable to use a so-called flash concentration method. In the flash concentration method, a solution with a lower concentration than intended is prepared, and then a part of a solvent is evaporated by jetting a part of the solvent by a known flash device.

The concentration of cellulose acylate in the dope to be cast is preferably in a range from 5 wt. % to 40 wt. %, and more preferably in a range from 15 wt. % to 30 wt. %, and furthermore preferably in a range from 17 wt. % to 25 wt. %.

A bubbling device 43 mixes air into the second dope and forms air bubbles in the second dope. These air bubbles are formed into the elements 24. The bubbling device 43 sends the second dope containing the air bubbles to a stationary mixer 44. The stationary mixer 44 shears the second dope containing the air bubbles. Thereby, the air bubbles are cut down to a size suitable for forming the elements 24, and uniformly dispersed in the second dope. The size of the air bubbles are controlled by adjusting the viscosity of the second dope, an amount of air mixed into the second dope, the shearing of the stationary mixer 44 and the like.

To form the elements 24 with liquid bubbles, a liquid, for example, water is mixed into the second dope instead of air. To form elements 24 with a solid material, substantially conical or pyramidal elements made of the solid material are put in the second dope and dispersed uniformly.

A casting die 45 for casting a dope is provided in a casting area. To the casting die 45 are supplied the first dope from the first preparation device 41, and the second dope from the stationary mixer 44. A casting belt 46 as a support is disposed below the casting die 45. The casting belt 46 is an endless belt, and looped around each of rollers 47a and 47b. The casting belt 46 is held in the horizontal direction between the rollers 97a and 47b.

The roller 97a is a drive roller rotated by a drive motor (not shown). The roller 47b follows the rotation of the casting belt 46. The casting belt 46 rotates in a direction A (shown by an arrow) in accordance with the rotation of the roller 47a.

A decompression chamber 48 is provided upstream from the casting die 45 in the rotation direction A of the casting belt 46. The decompression chamber 48 decompresses an area upstream from a bead that is a dope between the casting die 45 and the casting belt 46.

The first dope and the second dope supplied to the casting die 45 are continuously cast in a two-layer structure onto the moving casting belt 46 from the casting die 45. Thus, a casting film 60 of the two-layer structure is formed on the casting belt 46. An upper layer 62 (see FIG. 6) is formed with the second dope, and a lower layer 61 (see FIG. 6) is formed with the first dope.

A heater 50 is connected to the rollers 47a and 47b. The heater 50 promotes drying of the casting film 60 by heating the casting belt 46 via the rollers 47a and 47b. Drying of the casting film 60 using the heater 50 is controlled so that the gas bubbles float up inside the upper layer 62 by the difference in specific gravity between the gas bubbles and the solution in the upper layer 62, and are formed into the desired conical or pyramidal shape and arranged, namely, the drying of the casting film 60 is controlled to maintain fluidity inside the upper layer 62 until the elements 24 obtain the desired shape and arrangement. In other words, abrupt drying of the casting film 60 immediately after the casting from the casting die 45 is prevented.

An air duct 49 further promotes drying of the casting film 60. Dry air is blown from the air duct 49 onto the casting film 60 on the casting belt 46 after the gas bubbles inside the upper layer 62 obtain predetermined shape and arrangement, for example. The dried casting film 60 is peeled off as the brightness enhancement sheet 20 from the casting belt 46, and then conveyed to a next process by a roller 70. The produced long brightness enhancement sheet 20 is cut into a size suitable for use in an LCD, for example, and used.

In this embodiment, heat is applied to the casting film 60 only from the casting belt 46 side during the formation and the arrangement of the elements 24. Alternatively or in addition, dry air may be blown onto the casting film 60 to promote drying from the upper layer 62 side thereof. On the contrary, the casting belt 46 may be cooled to gelate the casting film 60. The casting film 60 may be peeled off from the casting belt 46 after the casting film 60 is hardened enough to be conveyed by rollers, and then dried. In this case, the elements 24 are formed and arranged during the gelation of the casting film 60, and the formation of the arrangement of the elements are controlled by controlling the gelation.

Figure 6:
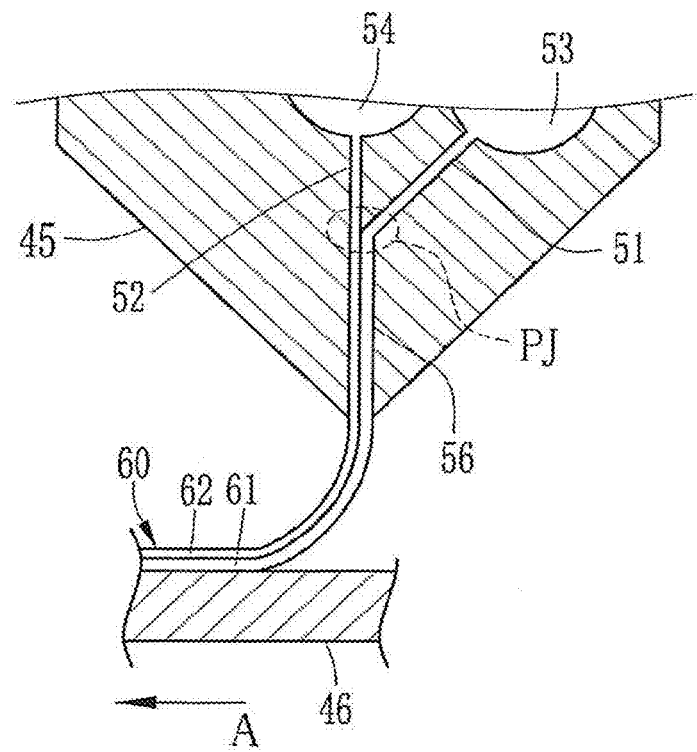
FIG. 6 is a schematic cross-sectional view of a casting die.

As shown in FIG. 6, a first channel 51 for the first dope and a second channel 52 for the second dope are formed inside the casting die 45. The first channel 51 and the second channel 52 are positioned in this order from the upstream side of the casting belt 46 in the direction A when the casting die 45 is disposed in a predetermined position.

The casting die 45 is a so-called multi-manifold type, and has manifolds 53 and 54. The first dope supplied from the first preparation device 41 is put into the manifold 53 connected to the first channel 51. The second dope supplied from the stationary mixer 44 is put into the manifold 59 connected to the second channel 52. The first and the second channels 51 and 52 are joined into a common channel 56 in a joining section PJ.

In the joining section PJ in the casting die 45, the first dope and the second dope are layered in this order from the upstream in the direction A of the casting belt 46. The first dope and the second dope flow through the common channel 56 and cast onto the casting belt 46 while keeping this two-layer structure. Thus, the casting film 60 with the two-layer structure of the lower layer 61 and the upper layer 62 is formed on the casting belt 46. The lower layer 61 is formed from the first dope and made into the base layer 21. The upper layer 62 is formed from the second dope and made into the brightness enhancement layer 22. It should be noted that illustration of the gas bubbles is omitted in FIG. 6.

Pressure is applied to the first dope and the second dope to discharge them from the casting die 45. The second dope contains the gas bubbles as described above. When the second dope is cast from the casting die 45, it is freed from pressure so that the gas bubbles expand to some extent. It should be noted that the size of the gas bubbles formed in the stationary mixer 44 is determined in consideration of this expansion.

When the first dope and the second dope are cast and formed into the casting film 60 on the casting belt 46, the gas bubbles float up inside the upper layer 62 (second dope) toward the surface thereof because the inside of the upper layer 62 has fluidity and the gas bubbles have smaller specific gravity than the solution contained in the upper layer 62. While the gas bubbles float up inside the upper layer 62, viscosity of solution contained in the upper layer 62 acts upon the gas bubbles, gradually tapering down the lower portion of the gas bubbles and making the top portion of the gas bubbles smooth. Thus, each of the gas bubbles gradually becomes substantially conical or pyramidal in shape as desired with the vertex pointing down while floating up toward the surface of the upper layer 62.

The floating up of the gas bubbles stops as the drying of the casting film 60 is promoted. When the casting film 60 is dried, the shape and the arrangement of the gas bubbles are fixed. Thus, the gas bubbles are formed into the elements 24 with the vertices pointing in one direction toward one of the surfaces of the brightness enhancement sheet 20.

Since the exposed surface of the casting film 60, that is, the exposed surface of the upper layer 62 dries faster than the inside of the upper layer 62, fluidity decreases earlier in the upper portion from the surface to a certain depth of the upper layer 62 than in the center or lower portion thereof. This stops the floating up of the gas bubbles at a certain depth in the upper layer 62. As a result, the plurality of elements 24 are arranged along the surface of the upper layer 62 in a substantially single layer at a certain depth.

In the above described film production apparatus, co-casting is performed, namely, plural dopes are layered and cast from the casting die. Alternatively, a sequential casting may be performed. For example, a dope for forming the base layer 21 is cast from the casting die onto the casting belt to form a casting film, and then a dope for forming the brightness enhancement layer 22 is cast from another casting die onto the casting film. In a case that the brightness enhancement sheet is composed only of the brightness enhancement layer 22, only the dope for forming the brightness enhancement layer 22 is cast.

In the above described embodiments, the brightness enhancement sheet 20 is formed with the base layer 21 so as to adjust the film thickness. In addition, a layer with high surface hardness may be provided to the brightness enhancement sheet 20 to make it scratch proof. Instead of providing additional layers, the surface hardness of the brightness enhancement sheet 20 or that of the brightness enhancement layer 22 may be increased.

Figure 7:
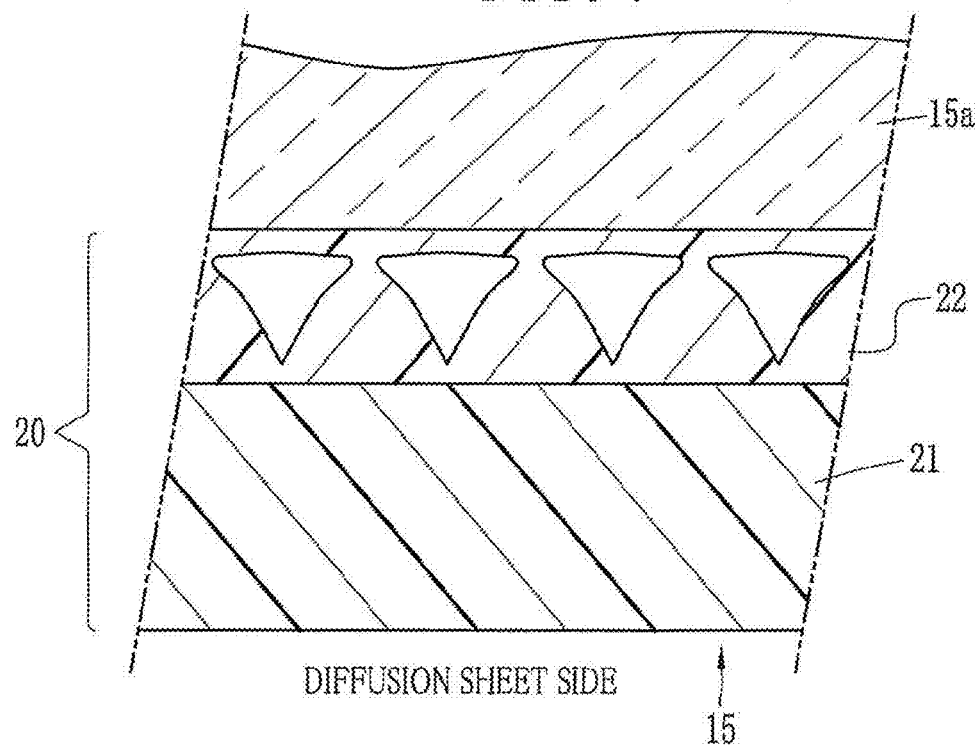
FIG. 7 is a cross-sectional view of a polarizing filter using the brightness enhancement sheet as a protection film.

As shown in FIG. 7, the brightness enhancement sheet 20 may be used as a protection film for the polarizing filter 15. In FIG. 7, the brightness enhancement sheet 20 is overlaid on the light source side of the polarizing film 15a of the polarizing filter 15 on the light source side of the LCD panel 11 as an example. The brightness enhancement sheet 20 has smooth surfaces, suitable for layering other sheet-like components on the brightness enhancement sheet 20.

In the above embodiments, examples in which the elements have a lower refractive index than the binder are described. However, the present invention is effective as long as the refractive index of the element is different from the refractive index of the binder. Accordingly, the elements with the higher refractive index than the binder may be contained inside the binder. In this case, brightness is enhanced by placing the brightness enhancement sheet such that light is incident from the surface of the brightness enhancement sheet on the base side of the elements, and is output from the surface on the apex side of the elements.

EXAMPLES

In examples 1 to 8 and comparative examples 1 and 2, the brightness enhancement sheet 20 shown in FIG. 2 was produced and brightness enhancement properties were evaluated. In each of the examples and the comparative examples, the brightness enhancement sheet 20 was composed of the base layer 21 and the brightness enhancement layer 22, both made from TAC. A height H1 of the element 24 was 40 μm, and a thickness H2 of the brightness enhancement layer 22 (binder 23) was 50 μm. Each of the materials used for forming the elements 24 has a lower refractive index than TAC.

Example 1

In the example 1, the elements 24 made from PMMA (polymethylmethacrylate) were used. The elements 24 were substantially conical in shape. The vertex-corresponding angle of each element 24 was 70 degrees. The brightness enhancement sheet 20 was produced with the projected area ratio of 0.5. A refractive index difference (Δn) between the PMMA and the TAC used in the example 1 was 0.02.

Example 2

In the example 2, by mixing water in the form of bubbles into the dope, the substantially conical elements 24 were formed using a technique similar to the film production apparatus shown in FIG. 5. The vertex-corresponding angle θ of each element 24 was 70 degrees. The brightness enhancement sheet 20 was produced with the projected area ratio of 0.5. The refractive index difference (Δn) between water and the TAC was approximately 0.15.

Example 3

In the example 3, the brightness enhancement sheet 20 was produced under the same conditions as in the example 2 except that the projected area ratio was 0.6.

Example 4

In the example 4, by mixing air in the form of bubbles into the dope, the substantially conical elements 24 were formed using a technique similar to the film production apparatus shown in FIG. 5. The vertex-corresponding angle θ of each element 24 was 50 degrees. The brightness enhancement sheet 20 was produced with the projected area ratio of 0.5. The refractive index difference (Δn) between air and the TAC used was approximately 0.40.

Example 5

In the example 5, the brightness enhancement sheet 20 was produced under the same conditions as in the example 4 except that the projected area ratio was 0.7.

Example 6

In the example 6, the brightness enhancement sheet 20 was produced under the same conditions as in the example 1 except that the projected area ratio was 0.3.

Comparative Example 1

In the comparative example 1, the brightness enhancement sheet containing spherical elements made from PMMA (polymethylmethacrylate) inside the binder was produced. The refractive indices of the PMMA and TAC used in the comparative example 1 were the same as those used in the example 1. The projected area ratio of the spherical elements to the brightness enhancement sheet was 0.5.

Example 7

In the example 7, the brightness enhancement sheet 20 was produced under the same conditions as in the examples 2 and 3 except that the projected area ratio was 0.3.

Comparative Example 2

In the comparative example 2, the brightness enhancement sheet 20 containing spherical water bubbles as the elements in the binder was produced. The projected area ratio of the spherical water bubbles to the brightness enhancement sheet 20 was 0.5.

Example 8

In the example 8, the brightness enhancement sheet was produced under the same conditions as in the examples 4 and 5 except that the projected area ratio was 0.3.

Measurement results of the percentage of the brightness enhancement in the examples 1 to 8 and the comparative examples 1 and 2 are shown in Table 1 below. The percentage of the brightness enhancement is obtained by the following mathematical expression:

Percentage (%) of the brightness enhancement=(evaluated brightness−reference brightness)/reference brightness×100 where the evaluated brightness is the measured front brightness of the brightness enhancement sheet, and the reference brightness is the measured front brightness without the use of the brightness enhancement sheet, that is, the measured front brightness of the diffusion sheet.

TABLE 1

| | material | Δn | shape | angle θ | ratio | percentage (%) |
|---|---|---|---|---|---|---|
| E1 | PMMA | 0.02 | substantially conical | 70 | 0.5 | 5 |
| E2 | Water | 0.15 | substantially conical | 70 | 0.5 | 11 |
| E3 | Water | 0.15 | substantially conical | 70 | 0.6 | 15 |
| E4 | Air | 0.48 | substantially conical | 50 | 0.5 | 15 |
| E5 | Air | 0.48 | substantially conical | 50 | 0.7 | 21 |
| E6 | PMMA | 0.02 | substantially conical | 70 | 0.3 | 3 |
| C1 | PMMA | 0.02 | spherical | — | 0.5 | (≈)2 |
| E7 | Water | 0.15 | substantially conical | 70 | 0.3 | 4 |
| C2 | Water | 0.15 | spherical | — | 0.5 | (≈)2 |
| E8 | Air | 0.48 | substantially conical | 50 | 0.3 | 4 |

"Material" indicates the material of the elements. "Δn" indicates the refractive index difference between the material of the elements and the binder 23. "Shape" indicates the shape of the element. "Angle θ" indicates the vertex-corresponding angle θ (degrees). "Ratio" indicates the projected area ratio. "Percentage (%)" indicates a percentage of the enhanced front brightness.

Various changes and modifications are possible in the present invention and may be understood to be within the present invention.

What is claimed is:

1. A method for producing a brightness enhancement sheet comprising the steps of:
    forming a casting film by casting a dope on a moving support, said dope containing a solution and a plurality of gas bubbles or liquid bubbles dispersed in said solution, said solution containing polymer and having predetermined viscosity, said gas bubbles or said liquid bubbles having lower specific gravity and differing in refractive index from said polymer; and
    floating up said gas bubbles or said liquid bubbles inside said casting film by a difference in specific gravity between said solution and said gas bubbles or said liquid bubbles and forming said gas bubbles or said liquid bubbles into a plurality of substantially conical or pyramidal elements with vertices pointing down and arranging said elements inside said casting film while inside of said casting film has fluidity.

2. The method of claim 1, wherein said gas bubbles or said liquid bubbles have a lower refractive index than said polymer.

3. A method for producing a brightness enhancement sheet comprising the steps of:
    forming a casting film by casting said dope on a moving support, said dope containing a solution and a plurality of elements dispersed in said solution, said solution containing polymer and having predetermined viscosity, said elements being made of a solid material and substantially conical or pyramidal in shape, each of said elements having lower specific gravity and differing in refractive index from said polymer; and
    floating up said elements inside said casting film by a difference in specific gravity between said solution and said elements and arranging said elements in said casting film such that vertices of said elements point in one direction toward one of surfaces of said casting film while inside of said casting film has fluidity.

4. The method of claim 3, wherein said solid has a lower refractive index than said polymer.

* * * * *